Jan. 25, 1966 R. E. HERSEY 3,231,682
DIRECT SUBSCRIBER DIALING SYSTEM FROM SATELLITE
TO MASTER SWITCHING OFFICE
Filed Nov. 8, 1962
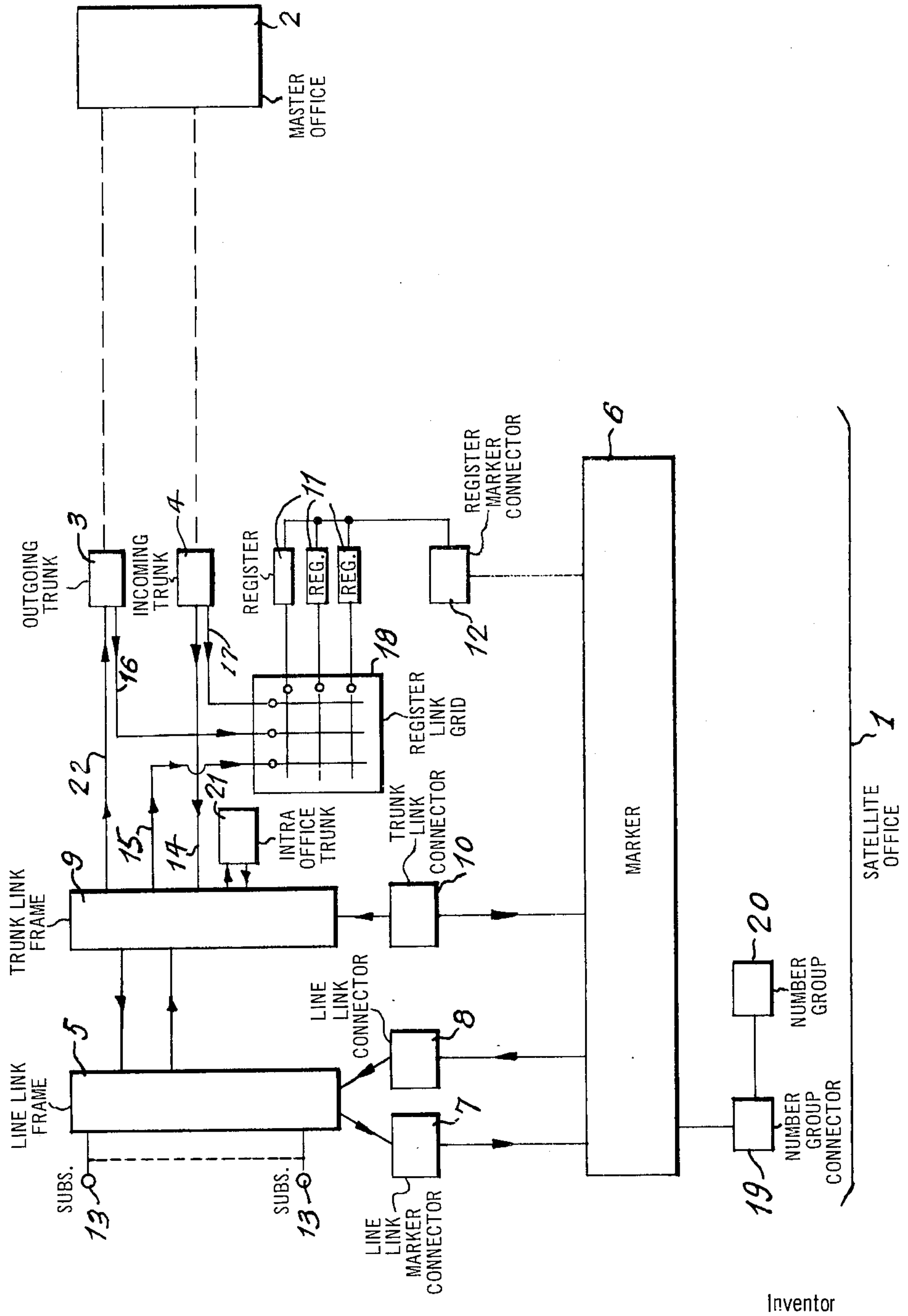
Inventor
Ralph E. HERSEY
Robert B. Harmon
Attorney

United States Patent Office 3,231,682

Patented Jan. 25, 1966

3,231,682

DIRECT SUBSCRIBER DIALING SYSTEM FROM SATELLITE TO MASTER SWITCHING OFFICE

Ralph E. Hersey, Denville, N.J., assignor to Northern Electric Company, Limited, Montreal, Quebec, Canada, a corporation of Canada Filed Nov. 8, 1962, Ser. No. 236,366

4 Claims. (Cl. 179—18)

This invention relates to telephone systems employing direct distance dialing (DDD) and more particularly to satellite offices for common control telephone systems.

While the invention disclosed herein applies generally to any common control switching system, it will be described more specifically in connection with a cross-bar telephone system, employing a marker and an associated digital register which are well known. In these systems from the information received from the register, the marker sets the path over which the supervisory signals are transmitted, the signalling to the called subscriber's line, and also sets the path for the operation of the cross-bar switches in the switching network required to make the talking connection.

If the call from one subscriber is to be connected to another subscriber in the same satellite office, known as an intra-office call, the calling line is connected through a line link frame and trunk link frame of a switching network to an idle intra-office trunk and in turn from the intra-office trunk through the trunk link frame and line link frame to the called subscriber's line.

If the call is outgoing from the satellite office to the master office, the calling line is connected through a line link and trunk link frame to an idle outgoing trunk of the proper class to the master office. These calls require the services of a sender connected to the trunk through an outgoing sender link frame. The function of the sender is to forward the calling signal such as the subscriber's dialled digits to a distant switching center such as the master office which on receiving the information connects to the distant called subscriber.

Where the call is incoming via an incoming trunk to the satellite office from the master office, in which case the call may have originated at the master office or at some point beyond in the DDD network, the incoming trunk seizes an incoming register through an incoming register link frame. When the called number and other necessary information are stored in the incoming register, the register connects to the marker, the marker then connecting the incoming trunk through to the called line via a trunk link and a line link frame.

In all these calls when the connection has been set up to the proper trunk and subscriber through the line link frame and the trunk link frame, all the equipment used in setting up the call such as marker, register, sender, etc., and associated connector frames release from the connection and are available to serve another call. This latter equipment is referred to as common control equipment and the quantity of each are dependent on their rapidity and the number of calls which are to be processed within a given time.

A more detailed description of telephone systems of this type may be had by referring to U.S. Patent 2,585,904 to A. J. Busch, February 19, 1952, generally described in column 5, lines 50 to 75, and column 6, lines 1 to 30.

It is also well known that cross-bar systems of the indicated type may be provided with centralized automatic message accounting (CAMA) at a master office serving a number of satellite offices to permit the use of direct distance dialing.

It is now commonly accepted practice that subscribers who wish to place a call on the DDD network must prefix the called party telephone code by one or more prefix digits in order that the switching equipment recognize that this call is for the DDD network and is not intended to be completed within the same satellite office. A more detailed description of this number system may be had by referring to Communications and Electronics, January 1960, page 173, by O. Meyer.

Common control switching systems have the advantage over other telephone systems in that a large number of switches can be controlled by a small number of common control circuits. However, these systems have heretofore required a sender in the satellite office for outpulsing to the master office. They also require an incoming register for the receiving of dialled digits from the master office as well as an originating register for the receiving of dialled digits from the local subscriber in the satellite office.

An object of this invention is to simplify the means for completing calls between a satellite office of the common control type and a master office by eliminating the need for senders.

Another object of this invention is to eliminate the need for incoming registers when completing calls originated at or through the master office to a called subscriber in the satellite office.

A further object of this invention is to eliminate the need for senders in a satellite office where all calls to the DDD network are made by dialling an access or prefix code before the called directory code.

A still further object of this invention is to provide a novel arrangement of switching networks between subscriber lines, incoming trunks, outgoing trunks, and digital registers.

These and other objects of this invention are attained by providing the telephone system including a satellite and a master office in which the former is provided with a switching network and a digital register. A marker is provided with means to control the switching network; to set the path for supervisory signals, and to operate the switches required for the connection. Connected between the seized register and the trunk link switches, outgoing trunks and incoming trunks, is a novel switch network, through which the supervisory signals and other function of the connection are directed when setting up an incoming or outgoing call to the master office.

A better understanding of the invention may be had by referring to the following description taken with the single drawing which illustrate a function flow of the cross-bar telephone system.

Considering the drawing there is shown a satellite office 1 connected to a master office 2 by outgoing and incoming trunks 3 and 4 respectively. Disposed in the satellite office 1 is line link frame 5 connected to marker 6 through line link marker connector 7, and line link connector 8, the marker 6 being connected to the trunk link frame 9 through trunk link connector 10. The marker 6 is also connected to a conventional digital register 11 through the register marker connector 12. The subscribers lines 13 are connected to line link frame 5. Number group 20 is connected to marker 6 through number group connector 19.

Connected between register 11 and trunk link frame 9 and outgoing trunk 3 and incoming trunk 4, through conductors 15, 16 and 17 is register link grid 18. The incoming trunk 4 is also connected to the trunk link frame 9 through conductor 14. The outgoing trunk 3 is also connected to the trunk link frame 9 through conductors 22.

OPERATION

In the operation of the circuit, the register as described hereinafter performs the following functions:

(1) Returns dial tone to the calling subscriber through the line link frame, trunk link frame, outgoing trunk circuit, and register link grid as established by the marker.

(2) Initiates marker action to direct busy tone to the calling subscriber when outgoing trunks are busy and the subscriber has indicated by the digits he has dialed that an outgoing call is to be made.

(3) Releases after the directing digit or digits are dialled indicating that the call is outgoing through the master office, and provided that an outgoing trunk is free and idle.

(4) Records the dialled information on incoming calls and thereafter initiates marker action to complete the call from the incoming trunk to the called subscriber.

(5) Records the dialled information for intra-office calls and thereafter initiates marker action to complete the local connection between the calling and called subscribers.

The marker 6 performs the following functions:

(1) Arranges to set up a connection through the line link frame and trunk link frame to an outgoing trunk circuit and then to a register when a signal appears on the subscriber's line 13 indicating that the subscriber wishes to make a call.

(2) Sets the path through the above mentioned equipment for the return of dial tone.

(3) Connects incoming trunks to the called subscribers' lines at the request of the register.

(4) Sets the path for the return of a busy signal on an intra-office call should the called subscriber's line be busy.

(5) Determines from the called digits passed to it by the register on an incoming or intra-office call (from information stored in the number group), the actual physical location of the called subscriber's line on the line link frame.

The arrows indicate the direction of the calls.

DIAL TONE CONNECTION

When a calling subscriber 13 lifts his handset connected to the satellite office, a signal on his subscriber's line derived from this action indicates to the marker to set up a connection from the subscriber's line to the register 11 through the circuits 13–5–9–22–16–18–11. Register 11 returns dial tone to the subscriber's line 13 through the above connection. The connection is set up by marker 6 through connections established to line link frame 5 and trunk link frame 9; the request for connection being recognized by marker 6 from a signal passed from line link frame 5 through line link marker connector 7 to marker 6 and thence from marker 6 to line link frame 5 through line link connector 8. The marker than causes the connection of an idle path from the calling subscriber's line 13 through the line link frame and the trunk link frame to the outgoing trunk in a similar manner to that described in the aforementioned patent, and then to conductor 16. The connection of register 11 to conductor 16 through register link grid 18 is set up through register link grid circuits associated with register link grid 18 recognizing that a signal exists on conductor 16. This action of setting a register 11 to connect to a conductor 16 through a register frame grid 18 without the intervention of any other common control equipment such as marker 6 is well known in the art, and similar to the manner in which an incoming trunk is connected to an incoming register in the aforementioned patent.

The connection of register 11 through to subscriber's line 13 indicates to the subscriber by means of dial tone that the circuit is now in the condition to receive the dialled impulses.

Should conductor 22 be not available due to all outgoing trunks 3 being already occupied with other calls, the connection to register 11 through register link grid 18 rather than being through conductors 22 and 16 from trunk link 9 will instead be set up from trunk link frame 9 and register link grid 18 through conductor 15. This is done using well known circuits for selecting an idle outgoing trunk as first choice and then terminals such as that leading to conductor 15 as second choice if the outgoing trunk is busy. Alternate idle trunk selections circuits of this sort associated with crossbar switches (such as the one herein designated as register link grid), registers, or the marker, are fully described in the aforementioned patent to A. J. Busch.

OUTGOING CALL TO MASTER OFFICE (DDD CALL) (ALL OUTGOING TRUNK 3 IDLE)

When the subscriber dials a predetermined prefix code, for example the digit 1, indicating a call to be completed over the DDD network through the master office, the dialling path is over the circuits 13–5–9–22–16–18–11. This action causes register 11 and its connection through register link 18 to release, since the register will recognize the significance of the dialled prefix digit 1. This digit 1 is in this instance significant since it is a digit which is conventionally never used as the first digit of a subscriber's telephone number. Other prefixes could be used such as 11, 112, etc. The register release is accomplished in a well-known manner similar to the case in which the register release is for a call to the operator, as fully described in the aforementioned patent to A. J. Busch. With the release of register 11 and register link 18, from outgoing trunk 3, all subsequent dialled digits which constitute the standard 7 or 10 digits required to complete a call over the DDD network will now be directed from the subscriber's line 13 over the circuits 13–5–9–22–3 to master office 2. The master office accepts these digits and routes them to the desired destination.

OUTGOING CALL TO MASTER OFFICE (DDD CALLS) (ALL OUTGOING TRUNKS 3 BUSY)

If, when the subscriber originates a call and trunk 3 is busy, the connection from register 11 to subscriber's line 13 is set up through conductor 15 as described in the dial tone connection above. Under this condition the register 11 will recognize that the connection has been established to subscriber's line 13 through conductor 15. If the subscriber dials the prefix code digit 1 the register 11 recognizing this code in a well known manner as indicating a desired connection to the master office will initiate marker action through connector 12 to return busy tone to subscriber's line 13 as an indication that the outgoing trunk 3 is not available to master office 2.

INTRA OFFICE CALL (ALL OUTGOING TRUNKS 3 IDLE)

If the subscriber requires an intra office trunk because he is calling another local subscriber the prefix code digit 1 is not dialled. Register 11, recognizing that the call is not for master office 2 and hence not requiring the use of outgoing trunk 3, will signal outgoing trunk 3 through register grid link 18, conductor 16 to outgoing trunk 3 that it is to drop its connection to register 11. The subscriber however completes dialling the local number into register 11. After register 11 recognizes in a well known manner that it has received all the dialled digits (normally 7) it signals the marker through register marker connector 12 to set up the intra office trunk 21 between the two subscriber's lines 13 and will disconnect its connection to conductor 22. Marker 6 accomplishes this action in the same manner as outlined in the aforementioned U.S. patent.

INTRA OFFICE CALL (ALL OUTGOING TRUNKS 3 BUSY)

If all outgoing trunks are busy the initial connection to the register is through conductor 15. In this case, as the register recognizes that the prefix digit 1 has not been dialled, it allowed the calling subscriber to continue dialling by not returning the busy signal and after the digits have been completed the connection between subscriber's line 13 to an intra office trunk 21 is set up in the same manner as described in the section immediately above.

INCOMING CALLS

On the incoming call from the master office 2 the seizure of incoming trunk 4 over the trunk conductors from master office 2 will cause register 11 to be connected to incoming trunk 4 via conductor 17 and register link grid 18. The indication of a call to be transmitted via conductor 17 will cause the circuitry associated with the register grid 18 to connect conductor 17 through the grid to register 11 in a manner well known in the art. After the register 11 has recorded the information dialled in through the master office, usually only 4 digits, the register requests marker 6 through register marker connector 12 to set up the connection from the incoming trunk 4 to subscriber's line 13. Marker 6 after determining from number group 20 reached through number group connector 19 the actual physical location of subscriber's line 13 on line link frame 5, will cause a talking path to be set up by connecting, through line link connector 8 to line link frame 5 and trunk link connector 10 to trunk link frame 9, the talking path consisting of a linkage through the switches connected to the subscriber's line 13 through line link frame 5, trunk link frame 9, and conductor 14 to incoming trunk 4. After the connection between subscriber's line 13 and incoming trunk 4 has been set up, register 11, and switching grid 18 are disconnected from incoming trunk 4 and subscriber's line 13 and are free to serve another call.

It will be noted from the above method of operation that the claimed circuit arrangement provides for the following conditions:

(1) Where the subscriber desires a connection to his local area (intra-office call) and the linkage to the master office is busy, i.e. outgoing trunk 3 is busy, the satellite office 1 accepts the call and sets up the connection to the register 11 via conductor 15.

(2) Where the subscriber desires a connection to his local area (intra-office call) and the linkage to the master office is free, i.e. at least one outgoing trunk 3 idle, the connection to outgoing trunk 3 is dropped and the intra-office connection set up.

(3) Where the subscriber desires a connection to the master office and the linkage available is free, the connection is completed.

(4) Where the subscriber desires a connection to other than the local area, i.e. the DDD network and all linkages to the master office are busy the subscriber still has dial tone from local linkage to the register through conductor 15 which upon receipt of the beginning digits determines the call is to the distant area and in return gives a busy indication.

(5) Where a call is received over an incoming trunk the same register which serves locally initiated calls serves the call.

It will be noted that no sender equipment is required for calls to the master office, that register 11 is used for both calls originating by the calling subscriber at the satellite office and by calls originating in other offices and received on incoming trunk 4, and that after a call has been set up register 11 together with the other common control items, such as marker 6, etc., are released, and that outgoing trunk 3 is released when register 11 has determined that the calling subscriber is making an intra-office rather than an inter-office call.

What is claimed is:

1. A common control telephone system wherein a satellite office is connected to a master office by means of a transmission path, said system comprising subscribers' lines, a switching network interconnecting the subscribers' lines, an outgoing trunk circuit connected to the switching network, a register, a register link matrix connecting the register to said trunk circuit and to the switching network, and common control circuitry including associated connectors to said system; the common control equipment being operationally functional to connect a calling subscriber's line to the register through the switching network and register link matrix and to the outgoing trunk through the switching network; the register comprising means for disconnecting itself from the outgoing trunk when a calling signal appearing on the calling subscriber's line corresponds to a predetermined code signifying that the call is to be routed through the master office, thereby allowing the subsequent calling signals appearing on the calling subscriber's line to be transmitted directly through the outgoing trunk circuit to the master office.

2. A common control telephone system as defined in claim 1 including an intra-office trunk wherein the register comprises means to cause the outgoing trunk to disconnect itself from the register when a calling signal appearing on the calling subscriber's line does not correspond to the predetermined code, and thereupon to register the subsequent calling signals appearing on the calling subscriber's line, after which the common control equipment is caused by the register to connect the intra-office trunk to the switching network so as to provide a transmission path from the calling subscriber's line to a called subscriber's line corresponding to said calling signal.

3. A common control telephone system as defined in claim 1 wherein the common control equipment comprises means to connect the calling subscriber's line through the switching network and the register link matrix to the register when the outgoing trunk circuit is in use; the register comprises means to cause a source of busy tone to be connected through to the calling subscriber's line should said signals correspond to the predetermined code, and to register said calling signals should said signals not correspond to the predetermined code and thereupon to cause the common control equipment to connect the intra-office trunk to the switching network so as to provide a transmission path from the calling subscriber's line to the called subscriber's line corresponding to said calling signal.

4. A common control telephone system as defined in claim 1 including an incoming trunk circuit, wherein the register comprises means to connect itself to the incoming trunk circuit when a call is received from the master office, and to register the calling signals received by the incoming trunk circuit, and thereupon to cause the common control equipment to connect a called subscriber's line through the switching network to the incoming trunk.

References Cited by the Examiner

UNITED STATES PATENTS

| | | | |
|---|---|---|---|
| 2,165,924 | 7/1939 | Goodrum | 179—7.1 |
| 2,678,353 | 5/1954 | Ostline | 179—7.1 |
| 2,933,564 | 4/1960 | Pearce et al. | 179—18 |
| 2,938,957 | 5/1960 | Coleman | 179—18 |

ROBERT H. ROSE, *Primary Examiner.*

WALTER L. LYNDE, *Examiner.*

S. H. BOYER, *Assistant Examiner.*